United States Patent Office 3,254,144
Patented May 31, 1966

3,254,144
METHOD FOR THE PRODUCTION OF A RIGID MASS FOR ACETYLENE GAS CONTAINERS
Sten Mogensen, Djursholm, and Bengt Gunnar Nilsson, Lidingo, Sweden, assignors to Svenska Aktiebolaget Gasaccumulator, Lidingo, Sweden, a corporation of Sweden
No Drawing. Filed Jan. 16, 1961, Ser. No. 82,672
Claims priority, application Sweden, May 23, 1960, 5,054/60
7 Claims. (Cl. 264—42)

The present invention refers to a method for the production of a rigid mass for acetylene gas containers wherein said mass comprises substantially calcium silicate, made from a water-containing mixture of lime and silica, the porosity in the rigid mass being obtained by the presence of surplus water.

The invention is based upon the discovery that during the hardening of the mass by reaction between lime and silica, several phases are encountered; there is a tendency to contract the volume of the mass during certain phases, and to increase the volume of the mass during other phases. It has been observed that during the earlier phases the mass is still plastic; therefore, any subsequent phase, which has a tendency of increasing the volume of the mass, will compensate for any decrease in volume, which the mass has been subjected to in one or more earlier phases.

We have also observed that during the last phases when the mass has already obtained a rather high rigidity, contraction of the mass will take place if not prevented by suitable means. When such a contraction occurs it will cause a slot to be formed between the body of the rigid mass and the surrounding container. Thus if during the handling of the container, especially during transportation, it is subjected to a rather rough treatment the rigid mass, which is now loosely fitted in the interior of the container, will be thrown against the walls of said container. Thus, the rigid mass is gradually crumbled in powder-form, especially at its outer side, said powder falling to the bottom of the container, so that the slot between the rigid mass and the wall of the container will gradually increase, until it has finally reached such proportions, that a high risk for acetylene explosion will exist.

It has been proposed to alleviate the shrinkage problem encountered in making a tight fitting rigid mass for an acetylene gas container by incorporating a metallic compound in the mixture which will form a gas during the hardening of the mass. Thus, an expansion force will be developed which will prevent the shrinkage. Compounds which have been proposed include finely divided aluminum, zinc, and magnesium. These compounds react with lime for forming hydrogen and the metal salt of the lime, for example, calcium aluminate. However, the use of metallic compounds incorporated in the hardening mass has not proved entirely satisfactory.

Acetylene containers should have a highly porous, hygroscopic mass in the container with capillary communication between the pores in the mass. When the porosity is created by developing hydrogen gas within the mass, there is a tendency of the hydrogen filled pores to form a skin of high rigidity on the walls of each pore. Thus, many of the pores will have no capillary communication with the remaining network.

The present invention refers to a method for forming bigger pores in which an interior super-pressure is created during the hardening, without said pores being insulated relative to the remaining network; the super-pressure being sufficient to effectively prevent the formation of a space between the mass and the wall of the container as mentioned above.

According to the invention the raw material for the mass is mixed with grains of thermally expandable plastic. Such plastics have the property of increasing their volume under the influence of heat; simultaneously they become highly porous. When the mass is cooled they resume their earlier volume. Especially suitable for this purpose is polystyrene of a composition, that is thermally expandable. Satisfactory porosity has been obtained by using a mixture, wherein polystyrene comprises about 10% of the rigid substance in the mass before the starting of the procedure. However, one can also get very good results with a somewhat smaller or somewhat larger quantity of polystyrene. If one uses another plastic with other properties, the quantity must be accordingly recalculated. The state quantity will apply under the assumption, that one is not using any development of hydrogen gas for creating hygroscopic pores. If one should cause hydrogen to be developed in addition to the polystyrene or other similar plastic being used, then one can use a correspondingly smaller proportion of the plastic.

The majority of the plastics concerned, and more particularly the expandable polystyrene have good solubility in acetone. Thus, after the container has been filled with the rigid mass and has thereafter been burned and the water has been dried out, acetone can be put into the container to dissolve the present plastic. The pores created during the expansion of the plastic will therefore remain without any insulating rigid products on the walls of the pores. Although the acetone has received a given quantity of plastic, it does not significantly reduce the power of the acetone of dissolving acetylene. Although some plastics, when dissolved in the acetone, actually decrease acetylene absorption, a number of other plastics show a slight increase in the acetylene absorption of the acetone.

What we claim is:
1. A method of making an acetylene gas container comprising the steps of providing a container, filling said container with a mixture of an acetone soluble, thermally expandable plastic and a calcium-silicate cement mixture of silica, lime, and a substantial excess of water, heating the container to expand the plastic particles and set the cement, to form a rigid tightly fitted cementitious structure within the container, and further heating the cementitious structure to drive excess water therefrom to form a porous, rigid mass within the container suitable for storage of acetylene gas.

2. A method according to claim 1 further comprising the step of adding a solvent to dissolve the plastic material in the container after driving the excess water from the cementitious structure.

3. A method as set forth in claim 1 wherein the thermally expandable plastic is polystyrene.

4. A method as set forth in claim 1 wherein approximately 10 percent by weight of the rigid structure is a thermally expandable plastic.

5. A method according to claim 2 wherein acetone is the solvent and said solvent and the dissolved plastic remain within the rigid structure during use of the rigid structure as an acetylene gas container.

6. A method of making a porous, rigid, calcium silicate cementitious mass for acetylene storage containers comprising the steps of providing an admixture of a plurality of small particles of thermally expandable plastic and cement-forming constituents of silica, lime and a substantial excess of water, heating the mixture to expand the plastic particles and set the cementitious mass to form a rigid structure, and further heating the mixture at a temperature sufficient to evaporate the excess water from within the rigid structure to form a porous structure and further dissolving the plastic material with a solvent to increase the porsity of the rigid structure.

7. A method according to claim 6 wherein the plastic material is polystyrene and the solvent is acetone.

References Cited by the Examiner

UNITED STATES PATENTS

| | | | |
|---|---|---|---|
| 1,313,931 | 8/1919 | Walter | 264—42 |
| 2,422,251 | 6/1947 | O'Brian et al. | 252—457 XR |
| 2,933,455 | 4/1960 | Doying | 252—430 XR |
| 2,996,389 | 8/1961 | Fernhof | 106—71 |
| 3,021,291 | 2/1962 | Thiessen | 260—41 |
| 3,104,196 | 9/1963 | Shannon | 264—45 |

FOREIGN PATENTS 27,365   3/1921   Denmark.

OTHER REFERENCES

Brandt: German application No. B 30,084, Kl. 80b, Gr. 1/09, printed April 19, 1956, 106–87 (2 pages spec., no dwg.).

ROBERT F. WHITE, *Primary Examiner.*

JULIUS GREENWALD, SAMUEL H. BLECH, ALEXANDER H. BRODMERKEL, *Examiners.*

R. D. LOVERING, F. MARLOWE, *Assistant Examiners.*